United States Patent Office 3,583,937
Patented June 8, 1971

3,583,937
PROCESS OF PREPARING POLYURETHANE-
POLYUREA COMPOSITIONS HAVING FREE
ISOCYANATE GROUPS
Adolfas Damusis, Detroit, Mich., assignor to Wyandotte
Chemicals Corporation, Wyandotte, Mich.
No Drawing. Continuation-in-part of application Ser. No.
502,401, Oct. 22, 1965. This application Sept. 9, 1968,
Ser. No. 758,613
Int. Cl. C08g 22/00, 51/42
U.S. Cl. 260—31.4
10 Claims

ABSTRACT OF THE DISCLOSURE

A linear urethane-urea polymer having a high number of functional isocyanate groups is prepared by chain extending an isocyanate-terminated diol prepolymer with a blend of primary diamines and difunctional chain extenders, and then further reacting this resulting product with an organic di- or polyisocyanate. The reaction conditions are such that only one isocyanate group of each di- or polyisocyanate molecule is reacted with the chain-extended product.

---

This application is a continuation-in-part of patent application Ser. No. 502,401 filed Oct. 22, 1965 now abandoned.

This invention relates to new and useful high molecular weight urethane polymers possessing an excess but controlled amount of functional isocyanate groups. More specifically, the present invention relates to thermoplastic high molecular weight urethane-urea polymers, possessing an ordered arrangement of side branches containing excess functional isocyanate groups, and to a method of producing such polymers.

The chemistry and technology of polyurethanes has made great strides since the early work of Otto Bayer reported in Angewandte Chemie A 59, 257 (September 1947). Among the noteworthy advances in this area may be mentioned the production of polyurethane-urea polymers of elastomeric or plastic nature by the chain extension of isocyanate-terminated polyurethane polymers by reaction with water, thereby converting isocyanate groups to amine groups which then react with other isocyanate groups to form urea linkages. Diamines have also been reacted directly with isocyanate-terminated polyurethanes for purposes of chain extension through formation of urea linkages. The diamines produced by hydrolysis of isocyanates and likewise added as such to isocyanate-terminated polyurethanes have notably been primary diamines, such as tolylene diamine, an arylene diamine, and the like. Alkylene and cycloalkylene diamines have also been proposed as chain extenders of polyurethane polymers for purposes of producing elastomeric or plastic products.

These prior art polyurethane-urea polymers produced by chain extension using primary diamines are generally characterized by difficulty of processing on conventional rubber equipment, difficulty of processing to obtain useful values of tensile strength through vulcanization unless unsaturation has been built into the molecule, and are frequently highly colored. At utilizable tensile strength values, such products have been extremely difficult to process, due to the accompanying high degree of hardness. One factor to which such hardness can be attributed is the presence of two hydrogen atoms on each of the two diamine nitrogens which, upon reaction with an isocyanate-terminated polyurethane, produces a urea linkage in which each nitrogen atom bears a hydrogen atom which, being active, is replaceable by an isocyanate radical in the classic biuret formation reaction to form a urea linkage which is quadruplicately cross-linked.

Another and more likely explanation for difficulty in processing of such polymers prepared from primary diamines is the formation of hydrogen bonds due to the extra active hydrogen atoms on the urea nitrogens. While a multi-dimensional lattice structure is in theory highly desirable and even necessary for elastomeric qualities, an excess of active hydrogens and corresponding increased cross-linking or hydrogen-bonding is without question at least partially responsible for the hardness to tensile strength ratio above-mentioned and its attendant difficulties in processing.

Thus, the synthetic elastomeric polyurethane polymers of the prior art are often made by reacting together in a suitable fasion (1) a polyester or polyester-amide, (2) a bifunctional compound such as a diamine, and (3) a diisocyanate such as naphthalene-1,5-diisocyanate or p,p'-diphenylmethane diisocyanate, to give an uncured elastomeric product, and (4) effecting a cure of this product by intimately mixing therewith an organic polyisocyanate, generally a diisocyanate identical with that previously employed, in sufficient amount to effect the desired cure, and subjecting the resulting mixture to heat and pressure.

High molecular elastomeric coatings of the prior art are, in most cases, linear thermoplastics which have a low melting point. They are affected by boiling water and have poor solvent resistance. Even though they resemble lacquers in application, they do not in film properties. The penetration of the conventional urethane coatings into porous substrates is good, but in some cases it can be a disadvantage. Wood, leather and fabric coatings have to have a holdout property preventing penetration so that a good protective film can form on the surface.

One- or two-package conventional systems of the prior art are well known for their high chemical resistance, high degree of film hardness, mar-proofness, excellent abrasion resistance, and their other exceptional properties. But, the limited pot life of the two- component system and the dependence on the atmospheric moisture content of the one-component system are important disadvantages. Thus, curing of these coatings is slow, covering a period of 2–3 hours; faster curing highly catalyzed formulations must be applied only with special mixing and spraying equipment.

It is an object of this invention to provide urethane polymers possessing a unique combination of properties, such as high surface hardness, good flexibility and high tensile strength, high solvent resistance, and low discoloration upon aging.

A further object is to produce urethane polymers which are capable of use as lacquers and protective coatings, and to provide a process for their preparation.

A still further objective of this invention is to provide new urethane coatings in a one-package formulation, setting up independently of moisture, and drying to touch upon solvent evaporation. Another objective of the invention is to provide urethane compositions having a good pot life and outstanding film properties.

Other and further objects and advantages of the invention will become apparent upon consideration of the accompanying disclosure.

The new urethane coatings of this invention overcome many of the disadvantages of the prior art products. They are dry to touch upon solvent evaporation, do not penetrate into porous substrates, have an acceptable resistance to solvents and boiling water, and have high melting points. It was completely unexpected when it was discovered that the use of high molecular weight urethane-urea polymers, possessing an ordered arrangement of side chains containing excess functional isocyanate groups solved the problems encountered with the prior art polymers.

The present invention relates to high molecular weight urethane-urea polymers prepared from a linear intermediate possessing reactive urea groups which are sites for the controlled introduction of organic polyisocyanate side chains containing free isocyanate groups. The urea groups are the result of building in certain ordered amounts of primary aliphatic or aromatic diamine in the construction of the backbone of the linear intermediate. The polyurethane-urea polymers so formed are thus characterized by ordered urea-linked intermediate and terminal chains.

Broadly speaking, the pocess for preparing the urethane-urea polymers of this invention comprises the steps of (1) Reacting an excess of an organic diisocyanate (a) with a glycol (b) having a molecular weight in the approximate range of 250 to 4000 and selected from the group consisting of polyalkylene ether, polyester and polyurethane glycols, thereby forming a linear prepolymer (I);

(2) Adding said prepolymer (I) to a first liquid medium in an amount sufficient to provide therein a 10 to 50 weight percent concentration;

(3) Adding a chain-extending agent (II) comprising a mixture of a primary diamine and a difunctional compound to a second liquid medium in an amount sufficient to provide therein a 10 to 50 weight percent concentration, said chain-extending agent (II) having a molar ratio of difunctional compound to primary diamine in the range of 4.0:1.0 to 0.25:1.0;

(4) Mixing said first liquid medium containing prepolymer (I) with said second liquid medium containing chain-extending agent (II) in a proportion such that the molar ratio of prepolymer (I) to chain-extending agent (II) in the resulting mixture is in the range of 0.75:1.0 to 1.5:1.0, said mixing occurring at a temperature in the range of 0° to 25° C., thereby forming a linear intermediate (III); and (5) Reacting said linear intermediate (III) with an organic polyisocyanate (IV) under anhydrous conditions at a temperature in the range of 50° to 120° C. and for a period in the range of 0.5 hour to 2 hours, the molar ratio of said organic polyisocyanate (IV) to said primary diamine in said chain-extending agent (II) being in the range of 0.6:1.0 to 3.2:1.0.

The new urethane-urea polymers of this invention, besides their main use as lacquers and protective coatings, are capable of being cross-linked, through their ordered arrangement of side chains containing excess functional isocyanate groups, with various di- or polyfunctional agents, such as polyols, diamines, polyamines, di- or polymercaptans, and the like. The cross-linked products so produced can be advantageously used as elastomers and caulking compounds.

A detailed description of the products of this invention and the process for their preparation is set forth hereinafter.

POLYURETHANE PREPOLYMER—STARTING MATERIALS

The isocyanate-terminated polyurethane prepolymers (I) employed as starting materials according to the present invention may be any such type compound having a molecular weight in excess of about 500 which may be obtained by the reaction of a selected polymeric glycol (a), having an average molecular weight of at least 250, with a stoichiometric excess of an organic diisocyanate (b). Such prepolymers are capable of a molecular weight increase through chain-extension with the particular chain-extension agents described hereinafter.

The polyurethane polymers which may be extended according to this invention include those which are prepared from polyalkylene ether glycols and diisocyanates. The term "polyalkylene ether glycol" as used herein refers to a polyalkylene ether which contains terminal hydroxy groups. These compounds are derived from the polymerization of cyclic ethers such as alkylene oxides or dioxolane or from the condensation of glycols. They are sometimes known as polyoxyalkylene glycols, polyalkylene glycols, or polyalkylene oxide glycols, or dihydric polyoxyalkylenes. Those useful in preparing the products of this invention may be represented by the formula $HO(RO)_nH$, in which R stands for an alkylene radical and $n$ is an integer sufficiently large that the molecular weight of the compound is at least 250, i.e., large enough that the polyoxyalkylene group $—(RO)_n—$ has a formula weight of at least 232. Not all of the alkylene radicals present need to be the same. Glycols containing a mixture of radicals, as in the compound $HO(C_2H_4O)_pH$, $HO(C_2H_4O)_p(C_3H_6O)_q(C_2H_4O)_pH$,
$HO(C_4H_8O)_q(C_3H_6O)_pH$,
$HO(CH_2)_4O[—(CH_2)_4O]_q(CH_2)_4OH$, or
$HOCH_2CH_2S[—CH_2CH_2—O—CH_2—CH_2—S—]_qCH_2CH_2OH$ wherein $p$ and $q$ are together sufficient for attainment of the desired molecular weight, can be used.

The glycols are either viscous liquids or waxy solids. To be of value in preparing polymers according to this invention, the molecular weight of the glycol should be at least 250 and may be as high as 4,000. It is preferably between 400 and 1,000. Polytetramethylene ether glycols, also known as polybutylene ether glycols, may be employed. Polyethylene ether polypropylene ether glycols, having the above-indicated formula, are among the preferred glycols. Polyethylene ether glycols, poly-1,2-propylene ether glycols, polydecamethylene ether glycols, and poly-1,2-dimethylethylene ether glycols are representative of other operative compounds.

The preferred polymeric glycols (a) are polyoxyalkylene glycols, e.g., polyoxypropylene or polyoxybutylene glycols, of molecular weights between about 250 and 4000, preferably 400 to 1000 for polyoxypropylene glycols and 500 to 1200 for the polyoxybutylene glycols, as well as the polyoxyethylene-polyoxypropylene glycols of molecular weight between about 200 and 4000, preferably 400 to 1000.

Any of a wide variety of organic dissocyanates (b) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate (usually about 80/20), 4,4'-methylene-bis(phenylisocyanate), and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4'-methylene-bis(cyclohexylisocyanate) are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Additional diisocyanates which may be employed, for example, include: p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, and other diisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with a,a'-dibromo-p-xylene in the presence of alkali. In such products, the cyclic groups inserted in the polyether chain are preferably phenylene, naphthylene, 2,2-bis(4-hydroxyphenyl)propane or cyclohexylene radicals or these radicals containing alkyl or alkylene substituents, as in the tolylene, phenylethylene or xylylene radicals. Elastomers made using polyalkylene-arylene or polyalkylene-cycloalkylene ether glycols have improved freeze resistance as compared with the corresponding elastomers containing no cyclic radicals.

Another class of glycols useful in making polyurethanes extensible according to this invention are the polyalkylene ether-polythioether glycols. Such glycols may be represented by the formula $HO(OY)_nH$ in which Q represents hydrocarbon radicals, at least some of which are aklylene, Y represents chalcogen atoms, some of which are sulfur and the rest oxygen, and $n$ is an integer large enough so that the glycol has a molecular weight of at least 250. These products may be made by condensing together glycols and thioglycols in the presence of a catalyst such as p-toluenesulfonic acid. As will be noted, these compounds resemble the polyalkylene ether glycols except that some of the alkylene radicals are joined by sulfur rather than oxygen. In each case, however, the compounds have terminal hydroxy groups which take part in the reaction with the organic polyisocyanate.

Also included in the polyurethane products which may be extended according to this invention are those made from a high molecular weight, substantially linear polyester and an organic diisocyanate of the type previously described. Products of this sort are described in the aforementioned Bayer article in Angewandte Chemie, and in U.S. Patents 2,621,166, 2,625,531, and 2,625,532. The polyesters should have molecular weights of at least 250 and are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, 1,6-hexylene glycol, and decamethylene glycol, and dicarboxylic acids such as malonic, maleic, succinic, adipic, pimelic, sebacic, oxalic, phthalic, terephthalic, hexahydroterephthalic, and para-phenylenediacetic acids, decamethylene dicarboxylic acid, and the like. Another useful group of compounds for this purpose are polyester amides having terminal hydroxy groups. The preferred polyesters may be represented by the formula HO[B—OOC—B'—COO]$_n$BOH in which B and B' are hydrocarbon radicals derived from the glycol and dicarboxylic acid respectively and $n$ is an integer large enough so that the molecular weight of the compounds as a whole is at least 750 and that the polyester group —[B—OOC—B'—COO]$_n$BO— has a molecular formula weight of at least 732. Preferably such polyesters have a molecular weight in excess of 1000. The polyester resulting from reaction of adipic acid with alkylene glycols or polyalkylene glycols is preferred. In the preparation of these polyesters, the glycol is used in at least slight excess so that the polyesters contain terminal hydroxy groups which are available for reaction with the isocyanates. The same diisocyanates and reaction conditions useful in preparing polyurethanes from the polyalkylene ether glycols are also useful with the polyesters.

Polyurethane glycols may also be reacted with an organic diisocyanate to give isocyanate-terminated polyurethanes for use as starting materials in the present invention. The starting polyurethane glycol is prepared by reacting a molar excess of a polymeric glycol, such as a polyalkylene ether glycol, with the organic diisocyanate. The resulting polymer is a polyurethane containing terminal hydroxyl groups which may then be further reacted with additional diisocyanate to produce the starting isocyanate-terminated polyurethane prepolymer.

Another starting polyurethane prepolymer may be such as disclosed in U.S. Patent 2,861,981, namely, those prepared from a diisocyanate and the reaction product of an ester of an organic carboxylic acid with an excess of a saturated aliphatic glycol having only carbon atoms in its chain and a total of eight to fourteen carbon atoms, at least one two-carbon-atom branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula

—NH—CO—O—G—O—CO—NH— wherein the bivalent radical —O—G—O— is obtained by removing the terminal hydrogen atoms of a polymeric glycol, said glycol having a molecular weight of at least 250 and being selected from the group consisting of polyalkyleneether glycols, polyurethane glycols, polyalkylenearyleneether glycols, polyalkylenecyclo-alkyleneether glycols, polyalkyleneether-polythioether glycols, polyester amide glycols and polyester glycols of the formula HO—[B—O—CO—B'—CO—O]$_n$—B—OH wherein B and B' are hydrocarbon radicals and $n$ is an integer, and that a typical isocyanate-terminated polyurethane polymer produced from diisocyanates and dihydric glycols will on an average contain, at a 2/1 NCO/OH ratio, a plurality of intralinear molecules conforming to the formula

OCN—Y—NH—CO—O—G—O—CO—NH—Y—NCO wherein —O—G—O— has the value given previously and Y is the diisocyanate hydrocarbon radical.

CHAIN-EXTENDING AGENTS

The chain-extending agents of the present invention are mixtures of primary diamines and difunctional compounds. The molar ratio of difunctional compound to primary diamine is usually between 4.0:1.0 to 0.25:1.0, and preferably about 1.5:1.0.

Any suitable primary diamine may be used in the practice of this invention. These include aliphatic, aromatic, and cyclic diamines. These diamines are represented by the general formula:

H$_2$N—R—NH$_2$ wherein R is either an alkyl group, a cycloalkyl group, an aryl group, or it may be omitted altogether, in which case the nitrogens are linked together. Examples of these diamines are ethylene diamine, propylene diamine, hexamethylene diamine, 1,6-hexane diamine, isopropylene diamine, phenylenediamine, tolylenediamine, cyclohexyl diamine, cyclobutyl diamine, and the like.

The difunctional compounds that may be used are those compounds containing only one active hydrogen atom per functional group. The term "active hydrogen atom" refers to a hydrogen atom which, because of its position in the molecule, displays activity according to the Zerewitinoff test as described by Kohler in J. of American Chem. Soc., 49, 3181 (1927). This active hydrogen atom is usually attached to oxygen, nitrogen or a sulfur atom. Thus, suitable active hydrogen-containing groups as determined by the Zerewitinoff method which are reactive with the isocyanate-terminated prepolymer include —OH, —NH—, —COOH, and —SH. Examples of suitable types of organic compounds containing active hydrogen-containing groups are secondary diamines, aliphatic diols, dicarboxylic acids, and aliphatic thiols. Also, compounds may be used which contain different active hydrogen-containing groups. One type of compound having different active hydrogen-containing groups that is particularly suited for use in carrying out this invention is a substituted alkanolamine.

The secondary diamines that may be used include aliphatic, aromatic, cyclic, and heterocyclic secondary diamines. The aliphatic, aromatic, and cyclic diamines are represented by the general formula

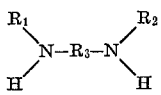

wherein $R_1$ and $R_2$ are alkyl groups, cycloalkyl groups, aryl groups, hydroxyalkyl groups, cyanoalkyl groups, or hydrogen. $R_3$ is either an alkyl group, a cycloalkyl group, an aryl group, or it may be omitted altogether, in which case the nitrogens are linked together. Examples of these diamines are ethylene diamine, N-(2-hydroxypropyl) ethylene diamine, N,N'-(biscyanoethyl ethylene diamine, and the like. The heterocyclic diamines are represented by the general formula

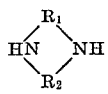

wherein $R_1$ and $R_2$ are alkyl groups, hydroxyalkyl groups, or cyanoalkyl groups. Examples of these diamines are 2-methylpiperazine, 2,5-dimethylpiperazine, piperazine, and the like.

Any suitable aliphatic diol may be used in the practice of this invention. Examples of these are ethylene glycol, 1,2-propylene glycol, 1,3-propylene glycol, 1,2-butylene glycol, 1,3-butylene glycol, 1,4-butylene glycol, 1,5-pentane diol, 1,6-hexane diol, 1,4-butane diol, and the like.

Any suitable aliphatic thiol containing two —SH groups may be used, such as, for example, 1,2-ethane dithiol, 1,2-propane dithiol, 1,6-hexane dithiol, 2-butene-1,4-dithiol, 3-hexyne-1,6-dithiol, and the like.

Any suitable dicarboxylic acid may be used, such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutanoic acid, and the like.

Any suitable substituted alkanolamine may be used in the practice of this invention. The term "substituted alkanolamine" refers to a compound having a hydroxyl group and a secondary amine group. These alkanolamines are represented by the formula

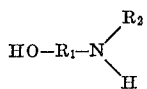

wherein $R_1$ and $R_2$ are either an alkyl group, an aryl group, or a cycloalkyl group. Examples of these alkanolamines are N-ethyl ethanolamine, N-propyl ethanolamine, N-butyl propanolamine, N-butyl ethanolamine, and the like.

POLYURETHANE PREPOLYMER PREPARATION

In the preparation of the starting polyurethane prepolymer (I), an excess of the organic diisocyanate (b) over the polymeric glycol (a) is used, which may be only a slight excess over the stoichiometric amount (i.e., one equivalent of diisocyanate for each equivalent of the polymeric glycol). In the case of a diisocyanate and a dihydric polyalkylene ether, the ratio of NCO to OH of the glycol will be between approximately 1.2–1.0 and 2.0–1.0. The glycol and the isocyanate are ordinarily reacted by heating with agitation at a temperature of 50° to 130° C., preferably 60° to 80° C. The equivalent ratio of organic diisocyanate compound (b) to polymeric glycol (a) is usually and preferably between about 1.2:1 and 2.0:1. When using these equivalent ratios an initial polyurethane pre-polymer reaction product (I) is obtained which is usually a liquid under the processing conditions outlined below.

The reaction is preferably, but not necessarily, effected in the absence of a solvent, when the prepolymer (I) is a fluid at processing temperatures. When it is not, or when it is desired to employ a nonaqueous solvent, it is usually preferred to use aromatic or oxygenated solvents or mixtures thereof. Examples of such solvents include toluene, xylene, 2-ethoxy-ethyl-acetate, methyl isobutyl ketone, and the like. Since the foregoing materials have a boiling range above 80° C., they are particularly suitable where the reaction is to be carried out in open equipment. Lower boiling solvents may of course be used where the reaction is to be carried out in closed equipment to prevent the solvent boiling off at the temperatures of the reaction. Blends of aromatic and oxygenated solvents, such as toluene and 2-ethoxy-ethyl-acetate, are particularly preferred solvents. The amount of solvent used may be varied widely, for example, from 0.2 to 1 part by weight of solvent for each part by weight of total reactants.

The reactants are cooked under a blanket of nitrogen for approximately 1–2 hours at a temperature of 50° to 130° C., to react most, if not all of the hydroxyl groups. A reaction time of one hour at a temperature of 60° to 80° C. is often preferred. Bases accelerate the reaction, acids retard the reaction, and preferably neither are added. Catalysts such as stannous octoate may be used as desired. The prepolymer (I) so formed is allowed to stand and the free NCO content is then determined.

CHAIN-EXTENSION PROCEDURE

Conventional solvent or latex technique is applied to the chain-extension procedure used to produce a linear intermediate (III) by reacting the polyurethane prepolymer (I) with a chain-extending agent (II) comprising a mixture of a primary diamine and a difunctional compound. The chain-extending agent (II) has a molar ratio of difunctional compound to primary diamine in the range of 4.0:1.0 to 0.25:1.0.

The amount of chain-extending agent (II) used in the chain-extension step is such that from 0.75 to 1.5 equivalents of chain-extending agent (II) are present in the chain-extension reaction for each equivalent of the isocyanate-terminated polyurethane prepolymer (I), preferably about 1.0 equivalent of chain-extending agent (II) for each equivalent of prepolymer (I). The higher ranges ensure mainly terminal chain-extending groups through provision of enough of reactant (II) to react with all of the isocyanate radicals present. For a diisocyanate dihydric polyalkylene glycol or similar polyurethane, the ratio will usually be one mole of chain-extending compound (II) for each mole of isocyanate-terminated polyurethane prepolymer (I).

When employing the latex technique of chain extension, the prepolymer (I) is dispersed in water so as to provide an aqueous emulsion containing 10 to 50, preferably 40 to 50, weight percent prepolymer (I). It is within the contemplation of this invention to dissolve prepolymer (I) in a nonaqueous solvent, such as toluene, prior to dispersion in the water. Also, a small amount of an emulsifying agent is usually added to the water. Any emulsifying agent which will give oil-in-water emulsions is satisfactory and such materials are disclosed in the prior art, e.g., in U.S. Patent No. 2,968,575. The chain-extending agent (II) is also dissolved or dispersed in water so as to provide a solution or dispersion containing 10 to 50, preferably 40 to 50, weight percent of chain-extending agent (II). The solution or dispersion of the chain-extending agent (II) is then added to the aqueous emulsion of prepolymer (I) according to the procedure described below. The chain-extending agent (II) may be used in an aqueous medium since it reacts more readily with the prepolymer (I) than does water itself. The chain-extension step, while a relatively fast reaction when employing the chain extenders of the invention, is accelerated by agitation of the emulsion. The agitation required may be accomplished by means of conventional equipment.

When employing the solvent technique of chain extension, the prepolymer (I) is dissolved in solvents such as those described under Polyurethane Prepolymer Preparation above so as to provide a solution containing 10 to 50, preferably 30 to 35, weight percent prepolymer (I). The chain-extending agent (II) is also dissolved in such solvents so as to provide a solution containing 10 to 50, preferably 20 to 25, weight percent of chain-extending agent (II). The solution of chain-extending agent (II) is then added to the solution of prepolymer (I) according to the procedure described below. Regardless of the technique used, it is important that the chain-extension reaction take place with the reactants in dilute concentrations.

It is a feature of this invention that the linear isocyanate-terminated prepolymer (I) reacts with only one of the available hydrogens on each end of the primary diamine molecule in the chain-extending agent (II). If this were not so, a certain amount of preliminary cross-linking would occur, thereby leading to the undesirable features of the prior art compounds. It has been found that if a dilute concentration of chain-extending agent (II) is added to a dilute concentration of prepolymer (I) in the proper ratio, at room temperature or lower and with agitation, so as to obtain a homogeneous dispersion or solution before reaction commences, the desired result is obtained. In the chain-extension step a temperature of 10° to 15° C. and a reaction period of 10-15 minutes are preferred.

The equivalent ratio of prepolymer (I) to chain-extending agent (II) in the chain-extension step, is in the range of 0.75:1.0 to 1.5:1.0. A ratio of 1:1 is preferred. The molar ratio of difunctional compound to primary diamine in the chain-extending agent (II) mixture is in the range of 4:1 to 0:1. The preferred ratio is 1.5:1.0. The mechanism of this preferential reaction is not completely known but it is felt to be due to the temperature, ratio of the reactants, mode of reaction and the preference of an isocyanate group to react with an amine hydrogen before a urea hydrogen or water molecule. Also, steric-hindrance is felt to be involved.

The linear intermediate (III), produced by the reaction and which possesses urea groups along the chain, may be coagulated from its aqueous dispersion or latex by methods normally employed in the coagulation of rubber or synthetic elastomers from their latices. The coagulated polymer when removed from the water must be dried. The drying may be accomplished by the use of conventional procedures. When applying solvent technique the linear intermediate (III) is retained in the liquid form and protected from absorbing moisture prior to use in the polymer preparation procedure described below.

POLYMER PREPARATION—PROCEDURE

The linear intermediate (III) is reacted with an organic polyisocyanate (IV) to produce the polyurethane-urea polymers (V) of this invention. The organic polyisocyanate (IV) used may be the organic diisocyanates utilized in the preparation of the isocyanate-terminated urethane prepolymer (I). The organic diisocyanates included in Polyurethane Prepolymer—Starting Materials (b) above, or they may be any suitable organic isocyanate compound containing a plurality of isocyanate groups. The reaction of the linear urethane intermediate (III) with the organic polyisocyanate (IV) is carried out in solvent solution or suspension. Those organic solvents which may be conveniently used are described under Polyurethane Prepolymer—Preparation above. Toluene and 2-ethoxy-ethyl-acetate are the preferred solvents.

It is essential to this reaction step, and contra to the Chain-Extension Procedure, that substantially anhydrous conditions be observed. The presence of water in this reaction step is associated with undesirable cross-linking. This cross-linking results from the reaction of water with free isocyanate groups with the formation of urea groups which are sites for subsequent reaction and cross-linking with other free isocyanate groups. Such products would be similar to those of the prior art and are not those of the present invention.

The polymers of this invention are those in which an ordered arrangement of side branches containing excess functional free isocyanate groups are present. The linear intermediate (III) produced above has been tailored to possess urea groups along the chain in an ordered manner. These urea groups possess reactive hydrogen atoms capable of reacting with the organic polyisocyanate (IV). The linear intermediate (III), if a liquid, is mixed with one of the organic solvents listed above. If the linear intermediate (III) is a solid, it is digested in the organic solvent. The organic polyisocyanate (IV) is added to the linear intermediate (III) under substantially anhydrous conditions, either by itself or dissolved in the organic solvent.

The amount of organic polyisocyanate (IV) added is determined by the amount of primary diamine present in the chain-extending agent (II) used in the chain-extension procedure to produce the linear intermediate (III) possessing reactive urea groups along the polymer chain. The equivalent ratio of organic polyisocyanate (IV) to the primary diamine chain-extender in the chain-extending agent (II) may be from 0.6:1.0 to 3.2:1.0. A ratio of 2.0:1.0 is preferred. The addition is made very rapidly, with vigorous agitation and prior to heating so as to obtain a homogeneous mixture before the reaction commences. The reaction is carried out under a blanket of nitrogen for a period of 0.5 hour to 2 hours and at a temperature of 50° to 120° C. with continuous agitation. The preferred reaction time is 1 hour at a preferred temperature of 60° to 80° C. Long reaction periods and high temperatures favor the undesired cross-linked products.

By this procedure free isocyanate groups equal to about 15% to 80%, preferably 50%, of the urea hydrogens on the linear intermediate (III) are introduced into the polymer by the reaction of a single isocyanate group of the organic polyisocyanate (IV) with a single urea hydrogen. This is due to the relative reactivity of the isocyanate groups and also to steric hindrance within the polymer itself. Thus, the side chain addition takes place preferentially at the site of the urea groups produced by the primary diamine chain-extending agent. The percent isocyanate is defined as the percent by weight of isocyanate groups present in an isocyanate compound. The percent isocyanate is thus indicative of free isocyanate and illustrative of the amount of side chains with reactive isocyanate groups which are introduced into the linear polymer. This determination was used to control and evaluate the preparation of the products of the invention.

The following examples are given to illustrate the invention, but are not to be construed as being unduly limitative. All parts listed are parts by weight unless otherwise indicated.

EXAMPLE I

A run was carried out in which a polyether urethane-urea polymer of this invention was prepared according to the procedure described below.

Part A—Prepolymer preparation 14,190 parts by weight of Pluracol P-410 (polyoxypropylene glycol, molecular weight 430), were charged into a reaction vessel and stirred with 3828 parts by weight of tolylene diisocyanate (80% of the 2,4-isomer and 20% of the 2,6-isomer) under a blanket of nitrogen for one hour at 80° C. 3.52 parts by weight of stannous octoate and 2002 parts by weight of toluene were added and the contents of the reactor stirred for an additional hour at 80° C.

The hydroxyl terminated linear prepolymer thus prepared was further reacted with 3828 parts by weight of tolylene diisocyanate (80% 2,4-isomer and 20% 2,6-isomer) for an additional hour at 80° C. to produce an isocyanate-terminated linear prepolymer.

The prepolymer was then diluted to a concentration of 70 weight percent with 2585 parts by weight of toluene and 20% 2,6-isomer) under the same conditions as described in Part C, Example I above.

The properties of the polymer so prepared are presented in Table 1.

TABLE 1.—POLYETHER URETHANE-UREA LACQUERS WITH SIDE BRANCHES CONTAINING FREE ISOCYANATE GROUPS

| Example Number | Control [1] | I | II | III |
|---|---|---|---|---|
| Properties: | | | | |
| Film appearance | Few pinholes | Few pinholes | Orange peel | Orange peel. |
| Mar proofness | Good | Good | Good | Good. |
| Sward Hardness | 24 | 28 | 30 | 32. |
| Tensile strength, p.s.i. | 5,630 | 4,008 | 6,471 | 6,579. |
| Elongation, percent | 430 | 196 | 296 | 307. |
| 100% modulus, p.s.i. | 2,630 | 3,050 | 3,060 | 1,800. |
| Abrasion resistance mg. loss/1,000 cycles, 1,000 g. CS-17 wheel. | 20 | 6 | 20 | 34. |
| Solvent resistance: | | | | |
| Toluene | Swells in 5 hours | No effect | No effect | No effect. |
| Cellosolve acetate | Swells in 20 minutes | Swells in 50 minutes | do | Do. |
| Water resistance: | | | | |
| 24 hours immersion at 25° C | Milky | No change | No change | No change. |
| ½ in boiling water, 100° C | Very milky shrinks | Milky | Slightly milky recovers | Do. |
| Percent isocyanate: | | | | |
| Calculated | 0.10 | .27 | .45 | .63. |
| Found | 0.11 | .29 | .50 | .70. |

[1] Control run in which the polymer obtained had no side chains containing free isocyanate groups.

and 4587 parts by weight of ethyl acetate. The linear isocyanate-terminated prepolymer had a free isocyanate value of 4.2% on the solid basis and 2.9% on the 70% solid basis. The equivalent weight per one isocyanate group of the 70% solution is 1410.

Part B—Prepolymer chain extension 31,020 parts by weight of the prepolymer prepared in Part A above were diluted to an approximately 30 weight percent concentration with 41,360 parts by weight of a 50/50 solvent blend of toluene and ethyl acetate solvents, reacted with 400 parts by weight of 2-methylpiperazine and 696 parts by weight of hexamethylene diamine dissolved in 4400 parts by weight of toluene.

The reaction was conducted for a period of 10 to 15 minutes with vigorous agitation at room temperature or lower. The reaction was instantaneous and exothermic and gave a slight rise in temperature. The linear intermediate thus obtained was diluted to a final concentration of approximately 25 weight percent with 14,470 parts by weight of a 50/50 solvent blend of toluene and ethyl acetate and kept in a well-closed container.

Part C—Side chain introduction 92,352 parts by weight of the linear intermediate prepared in Part B above were reacted with 696 parts by weight of tolylene diisocyanate (80% 2,4-isomer and 20% 2,6-isomer) for a period of one hour at 50° to 60° C. Anhydrous conditions were maintained and the reaction was carried out under a blanket of nitrogen.

The properties of the polymer prepared as above were compared to those of a control polymer where no side chains containing free isocyanate groups were introduced. The results of this comparison are shown in Table 1 below.

EXAMPLE II 92,352 parts by weight of the linear intermediate prepared in Part B, Example I above, were reacted with 1392 parts by weight of tolylene diisocyanate (80% 2,4-isomer and 20% 2,6-isomer) under the same conditions as described in Part C, Example I, above.

The properties of the polymer so prepared as presented in Table 1.

EXAMPLE III 92,352 parts by weight of the linear intermediate prepared in Part B, Example I above, were reacted with 2088 parts by weight of tolylene diisocyanate (80% 2,4-isomer and 20% 2,6-isomer) under the same conditions as described in Part C, Example I above.

The properties of the polymer so prepared are presented in Table 1.

EXAMPLE IV

A run was carried out in which a high molecular weight polyether urethane-urea polymer of this invention was prepared according to the procedure described below.

Part A.—Prepolymer chain extension 59,220 parts by weight of the prepolymer prepared in Part A, Example I above, was diluted to an approximately 30 weight percent concentration with 78,960 parts by weight of a 50/50 solvent blend of toluene and ethyl acetate solvents, and reacted with 800 parts by weight of 2-methylpiperazine and 1392 parts by weight of hexamethylene diamine dissolved in 8768 parts by weight of toluene.

The reaction was conducted for a period of 10 to 15 minutes with vigorous agitation at room temperature or lower. The reaction was instantaneous and exothermic and gave a slight rise in temperature. The linear intermediate thus obtained was diluted to a final concentration of approximately 20 weight percent with 69,090 parts by weight of a 50/50 solvent blend of toluene and ethyl acetate solvents and kept in a well-closed container.

Part B.—Side chain introduction 218,230 parts by weight of the linear intermediate in Part B above was reacted with 1392 parts by weight of tolylene diisocyanate (80% 2,4 - isomer and 20% 2,6-isomer) for a period of one hour at 50° to 60° C. Anhydrous conditions were maintained and the reaction was carried out under a blanket of nitrogen.

The properties of the polymer prepared as above were compared to those of a control polymer, where no side chains containing free isocyanate groups were introduced. The results of this comparison are shown in Table 2 below.

EXAMPLE V 218,230 parts by weight of the linear intermediate in Part A, Example IV above, were reacted with 2784 parts by weight of tolylene diisocyanate (80% 2,4-isomer and 20% 2,6-isomer) under the same conditions as described in Part B, Example IV above.

The properties of the polymer so prepared are presented in Table 2.

EXAMPLE VI 218,230 parts by weight of the linear intermediate prepared in Part A, Example IV above, were reacted with 4176 parts by weight of tolylene diisocyanate (80% 2,4-isomer and 20% 2,6-isomer) under the same conditions as described in Part B, Example IV above.

The properties of the polymer so prepared are presented in Table 2.

parts by weight of hexamethylene diamine dissolved in 2200 parts by weight of toluene.

TABLE 2.—POLYETHER URETHANE-UREA LACQUERS WITH SIDE BRANCHES CONTAINING FREE ISOCYANATE GROUPS

| Example Number | Control [1] | IV | V | VI |
|---|---|---|---|---|
| Properties: | | | | |
| Film appearance | Clear | Clear | Clear | Clear. |
| Mar proofness | Good | Good | Good | Good. |
| Dust free, hours | 0.25 | 0.25 | 0.25 | 0.25. |
| Pot life, hours | Gelled in 4 days | Increase in viscosity | No change in viscosity. | No change in viscosity. |
| Sward Hardness | 14 | 18 | 20 | 22. |
| Tensile strength, p.s.i. | 5,145 | 5,055 | 6,371 | 6,810. |
| Elongation, percent | 377 | 262 | 289 | 311. |
| 100% modulus, p.s.i. | 1,730 | 2,700 | 3,030 | 3,180. |
| Abrasion resistance, mg. loss/1,000 cycles, 1,000 g. CS-17 wheel. | 39 | 21 | 22 | 26. |
| Solvent resistance: | | | | |
| Toluene | Softens in 20 minutes | Swells in 22 hours | No effect | No effect. |
| Cellosolve acetate | Dissolved in 20 minutes. | Swells in 20 minutes | Softens in 40 minutes | Swells in 22 hours. |
| Water resistance: | | | | |
| 24 hours immersion at 25° C | Milky | Slightly milky | No change | No change. |
| 30 minutes in boiling water | Very milky | Milky | Milky, recovers | Slightly milky, recovers. |
| Percent isocyanate: | | | | |
| Calculated | .03 | .19 | .34 | .49. |
| Found | .03 | .21 | .39 | .59. |

[1] See footnote Table 1.

EXAMPLE VII

A run was carried out in which the polyester urethane-urea polymer of this invention was prepared according to the procedure described and wherein the chain-extending agent was an admixture of a secondary diamine and a primary diamine.

Part A.—Prepolymer preparation 438 parts by weight of adipic acid were heated at 220° to 230° C. with 1,720 parts by weight of Pluracol P-410 (polyoxypropylene glycol, molecular weight 430) in a reaction vessel for approximately 3 hours, until 108 parts by weight of condensation reaction water were removed.

A linear hydroxy terminated polymer was obtained with a hydroxyl number of approximately 54-55 and an acid number of approximately 1. This polymer was reacted with 348 parts by weight of tolylene diisocyanate (80% 2,4-isomer and 20% 2,6-isomer) for one hour at 70° to 80° C. to produce an isocyanate terminated linear prepolymer. The prepolymer was diluted to a concentration of 70 weight percent with 514 parts by weight of toluene and 514 parts by weight of 2-ethoxy-ethyl-acetate.

The prepolymer thus prepared was liquid and soluble in regular aromatic and oxygenated solvents. The free isocyanate content on the solid basis was 3.5% and was 2.5% on the 70% solid basis. The equivalent weight per one isocyanate group at 70% solids was 1,713.

Part B.—Prepolymer chain extension 20,556 parts by weight of the prepolymer prepared in Part A above were diluted with 20,556 parts by weight of a 50/50 blend of toluene and ethyl acetate to an approximately 35 weight percent concentration and reacted with 200 parts by weight of 2-methylpiperazine and 348

The reaction was carried out for a period of 10 to 15 minutes at room temperature or lower with vigorous agitation. The reaction was instantaneous and exothermic. The linear intermediate so obtained was kept in a well-closed container.

Part C.—Side chain introduction 43,860 parts by weight of the product obtained in Part B above were reacted with 348 parts by weight of tolylene diisocyanate (80% 2,4-isomer and 20% 2,6-isomer) for a period of one hour at 50° to 60° C. Anhydrous conditions were maintained and the reaction was carried out under a blanket of nitrogen.

The properties of the polymer prepared as above were compared to those of a control polymer where no side branches containing free isocyanate groups were present. The results of this comparison are shown in Table 3 below.

EXAMPLE VIII 43,860 parts by weight of the linear intermediate prepared in Part B, Example VII, were reacted with 696 parts by weight of tolylene diisocyanate (80% 2,4-isomer and 20% 2,6-isomer) under the same conditions as described in Part C, Example VII, above.

The properties of the polymer so prepared are presented in Table 3.

EXAMPLE IX 43,860 parts by weight of the linear intermediate prepared in Part B, Example VII, were reacted with 1044 parts by weight of tolylene diisocyanate (80% 2,4-isomer and 20% 2,6-isomer) under the same conditions as described in Part C, Example VII above.

The properties of the polymer so prepared are presented in Table 3.

TABLE 3.—POLYESTER URETHANE-UREA LACQUERS WITH SIDE BRANCHES CONTAINING FREE ISOCYANATE GROUPS

| Example Number | Control [1] | VII | VIII | IX |
|---|---|---|---|---|
| Properties: | | | | |
| Film appearance | Clear | Clear | Clear | Clear. |
| Mar proofness | Good | Good | Good | Good. |
| Sward Hardness | 30 | 32 | 34 | 34. |
| Tensile strength, p.s.i. | 3,860 | 4,076 | 4,266 | 4,186. |
| Elongation, percent | 520 | 310 | 280 | 320. |
| 100% modulus, p.s.i. | 1,620 | 1,820 | 1,960 | 1,860. |
| Abrasion resistance mg. loss/1,000 cycles 1,000 g. CS-17 wheel. | 38 | 24 | 32 | 36. |
| Solvent resistance: | | | | |
| Toluene | Swells in 2 hours | No effect | No effect | No effect. |
| Cellosolve acetate | Swells in 20 minutes | Swells in 1 hour | do | Do. |
| Water resistance: | | | | |
| 24 hours immersion at 25° C | Milky | No change | No change | No change. |
| ½ hour in boiling water, 100° C | Very milky blisters, swells. | Slightly milky | Very slightly milky | Do. |
| Percent isocyanate: | | | | |
| Calculated | .19 | .38 | .56 | .75. |
| Found | .21 | .42 | .63 | .83. |

[1] See footnote Table 1.

EXAMPLE X

A run was carried out in which the polyether urethane-urea polymer of this invention was prepared according to the following procedure, and wherein the chain-extending agent was a mixture of a diol and an aromatic primary diamine, and where the isocyanate groups on the polyisocyanate side chains were attached to different aromatic rings.

Part A.—Prepolymer preparation 5640 parts by weight of the prepolymer prepared in Example I, Part A, were reacted with 118 parts by weight of 1,6-hexane diol at 70° to 80° C. for approximately 3 hours. The polymer was reduced to a 60 weight percent concentration with 1042 parts by weight of a 50/50 blend of toluene and ethyl acetate solvents.

Part B.—Prepolymer chain extension 20,400 parts by weight of the polymer prepared in Part A above were reduced to an approximately 35 weight percent concentration with a 50/50 blend of toluene and ethyl acetate solvents and reacted with 236 parts by weight of phenylene diamine suspended in 944 parts by weight of a 50/50 blend of toluene and ethyl acetate solvents.

The reaction was carried out with vigorous agitation for a period of approximately 10 to 15 minutes, and at a temperature of 10° to 15° C. The linear intermediate so obtained was dried and kept in a well-closed container.

Part C.—Side chain introduction 35,526 parts by weight of the linear intermediate prepared in Part B above were reacted with 1000 parts by weight of 4,4'-methylene-bis (phenylisocyanate) for a period of one hour at 60° C. Anhydrous conditions were maintained and the reaction was carried out under a blanket of nitrogen. The properties of the polymer so prepared are presented in Table 4.

EXAMPLE XI

A run was carried out in which the polyester urethane-urea polymer of this invention was prepared according to the procedure described below, and wherein the chain-extending agent was a mixture of a diol and an alkyl primary diamine.

Part A.—Prepolymer preparation 6,852 parts by weight of the prepolymer prepared in Example VII, Part A, were reacted with 94 parts by weight of 1,4-butane diol at 80° to 90° C. for approximately 2 hours. The polymer was reduced to a 60 weight percent concentration with 1,204 parts by weight of a 50/50 blend of toluene and ethyl acetate solvents.

Part B.—Prepolymer chain extension 24,450 parts by weight of the linear polymer prepared in Part A above were reduced to an approximately 30 weight percent concentration with 17,463 parts by weight of a 50/50 blend of toluene and ethyl acetate solvents and reacted with 232 parts of 1,6-hexane diamine, which was dissolved in 928 parts by weight of toluene.

The reaction was instantaneous and exothermic and was carried out with vigorous agitation at 10° to 15° C. for a period of 10 to 15 minutes. The linear intermediate so obtained was dried and kept in a well-closed container.

Part C.—Side chain introduction 42,145 parts by weight of the linear intermediate prepared in Part B above were reacted with 696 parts by weight of tolylene diisocyanate (80% 2,4-isomer and 20% 2,6-isomer) for a period of one hour at 60° C. Anhydrous conditions were maintained and the reaction was carried out under a blanket of nitrogen. The properties of the polymer so prepared are presented in Table 4.

TABLE 4.—URETHANE-UREA LACQUERS WITH SIDE BRANCHES CONTAINING FREE ISOCYANATE GROUPS

| Example Number | X | XI |
|---|---|---|
| Properties: | | |
| Film appearance | Clear | Clear. |
| Mar proofness | Good | Good. |
| Sward Hardness | 32 | 36. |
| Tensile strength, p.s.i | 5,820 | 5,120. |
| Elongation, percent | 360 | 340. |
| 100% modulus, p.s.i | 2,760 | 1,960. |
| Abrasion resistance mg. loss/1,000 cycles, 1,000 g. CS-17 wheel | 16 | 28. |
| Solvent resistance: | | |
| Toluene | No effect | No effect. |
| Cellosolve acetate | Softens in 1 hour | Softens in 1 hour. |
| Water resistance: | | |
| 24 hours immersion at 25° C | No change | No change. |
| ½ in boiling water, 100° C | do | Do. |
| Percent isocyanate: | | |
| Calculated | .69 | .58. |
| Found | .72 | .63. |

EXAMPLE XII

A run was carried out in which a polyether urethane-urea polymer of this invention was prepared according to the following procedure, and wherein the chain-extending agent was a mixture of a diol and an aromatic primary diamine, and where the organic polyisocyanate side chains were alkyl polyisocyanates.

35,526 parts by weight of the linear intermediate prepared in Part B, Example X above, were reacted with 672 parts by weight of hexamethylene diisocyanate under the same conditions as described in Part C, Example X above. The properties of the polymer so prepared are presented in Table 5.

EXAMPLE XIII

A run was carried out in which a polyester urethane-urea polymer of this invention was prepared according to the following procedure, and wherein the chain-extending agent was a mixture of a diol and an alkyl primary diamine, and where the organic polyisocyanate side chains were alkyl polyisocyanates.

42,145 parts by weight of the linear intermediate prepared in Part B, Example XI above, were reacted with 672 parts by weight of hexamethylene diisocyanate under the same conditions as described in Part C, Example XI above. The properties of the polymer so prepared are presented in Table 5.

TABLE 5.—URETHANE-UREA LACQUERS WITH SIDE BRANCHES CONTAINING FREE ISOCYANATE GROUPS

| Example Number | XII | XIII |
|---|---|---|
| Properties: | | |
| Film appearance | Clear | Clear. |
| Mar proofness | Fair | Fair. |
| Sward Hardness | 12 | 14. |
| Tensile strength, p.s.i | 5,680 | 5,080. |
| Elongation, percent | 420 | 410. |
| 100% modulus, p.s.i | 1,660 | 1,510. |
| Abrasion resistance mg. loss/1,000 cycles, 1,000 g. CS-17 wheel | 12 | 14. |
| Solvent resistance: | | |
| Toluene | No effect | No effect. |
| Cellosolve acetate | Softens in ½ hour | Softens in ½ hour. |
| Water resistance: | | |
| 24 hour immersion at 25° C | No change | No change. |
| ½ in boiling water, 100° C | do | Do. |
| Percent isocyanate: | | |
| Calculated | .69 | .56. |
| Found | .74 | .66. |

EXAMPLE XIV

A run was carried out in which a polyether urethane-urea polymer of this invention was prepared according to the procedure described below. The latex technique was employed in the chain extension.

Part A.—Prepolymer preparation 2,010 parts by weight of a 670 molecular weight polyoxypropylene glycol were reacted with 1,044 parts by weight of tolylene diisocyanate. The reaction was carried out in toluene at 70% solids for two hours at 70° C. The resulting product was an isocyanate terminated prepolymer.

The isocyanate terminated prepolymer thus prepared was reacted with 2,200 parts by weight of a 550 molecular weight oxypropylene derivative of bisphenol for three hours at 90° C. A difunctional hydroxyl terminated linear prepolymer was produced.

This hydroxyl terminated prepolymer was further reacted with 1208 parts by weight of dimeryl diisocyanate for two hours at 90° C. A difunctional isocyanate terminated prepolymer was obtained.

The prepolymer was diluted to 70 weight percent with 518 parts by weight of toluene. The isocyanate terminated prepolymer had a free isocyanate value of .92% on a solid basis. The equivalent weight per one isocyanate group was 4,588.

Part B.—Prepolymer chain extension by the latex technique 50 parts by weight of 2-methyl piperazine was blended with 850 parts by weight of water.

An emulsion was prepared by blending 9,176 parts by weight of the isocyanate terminated prepolymer of Part A with 3,500 parts by weight water, 150 parts by weight of surfactant (a 16,250 molecular weight block copolymer of polyoxypropylene and polyoxyethylene wherein the polyoxyethylene constituted about 80% of the total weight of the copolymer), and 16 parts by weight of an antifoaming agent (a 7,700 molecular weight block copolymer of polyoxypropylene and polyoxyethylene wherein the polyoxyethylene constituted about 20% of the total weight of the copolymer).

Immediately after the emulsion was formed, the piperazine-water blend was added. The reaction was instantaneous and was conducted under vigorous agitation at room temperature.

The resulting product was a high molecular weight polymer containing urea groups evenly distributed along the chain of the polymer. These urea groups, having active hydrogens, were found to be susceptible for cross-linking with polyisocyanate compounds.

EXAMPLE XV

A run was carried out in which a polyether urethane-urea polymer of this invention was prepared according to the procedure described below. The latex technique was employed in the chain extension.

Part A.—Prepolymer preparation 2,125 parts by weight of a 425 molecular weight polyoxypropylene glycol were reacted with 696 parts by weight of tolylene disocyanate. The reaction was carried out in toluene at 70% solids for three hours at 90° C. The resulting product was a hydroxyl terminated prepolymer.

The hydroxyl terminated prepolymer thus prepared was reacted with 336 parts by weight of hexamethylene diisocyanate for three hours at 90° C. A difunctional isocyanate terminated linear prepolymer was produced.

The prepolymer was diluted to 70 weight percent with 144 parts by weight of toluene. The isocyanate terminated prepolymer had a free isocyanate value of 1.86% on a solid basis. The equivalent weight per one isocyanate group was 2,255.

Part B.—Prepolymer chain extension by the latex technique 116 parts by weight of 1,6-hexamethylene diamine was blended with 708 parts by weight of water.

An emulsion was prepared by blending 4,510 parts by weight of the isocyanate terminated prepolymer of Part A with 1300 parts by weight water, 80 parts by weight of surfactant (a 16,250 molecular weight block copolymer of polyoxypropylene and polyoxyethylene wherein the polyoxyethylene constituted about 80% of the total weight of the copolymer), and 8 parts by weight of an anti-foaming agent (a 7,700 molecular weight block copolymer of polyoxypropylene and polyoxyethylene wherein the polyoxyethylene constituted about 20% of the total weight of the copolymer).

Immediately after the emulsion was formed, the diamine-water blend was added. The reaction was instantaneous and was conducted under vigorous agitation at room temperature.

The resulting product was a high molecular weight polymer containing urea groups evenly distributed along the chain of the polymer. These urea groups, having active hydrogens, were found to be susceptible for cross-linking with polyisocyanate compounds.

In the foregoing tables the values shown for Sward Hardness, Tensile Strength, Elongation, 100% Modulus, and Abrasion Resistance were obtained by the following procedures:

Test:
  Sward Hardness _____ Procedure
  Tensile strength _____ ASTM D2134–62T.
  Elongation _____ ASTM D412–61T.
  100% modulus _____ ASTM D412–61T.
  Abrasion resistance _____ ASTM D412–61T.
Fed. Spec. TT–P–141–b, Method 619.2.

The data shown in Tables 1 to 5 illustrate the outstanding properties of the urethane-urea polymers of this invention. The polyether urethane-urea polymers prepared according to Examples V–VI demonstrate the critical number of side chains containing free isocyanate groups which must be introduced into the linear intermediate polymer, which possesses urea groups along the backbone of the polymer, in order to obtain the product of this invention. Examples VII–IX demonstrate the preparation and properties of polyester urethane-urea polymers of this invention. Examples X–XIII show various types and combinations of chain-extending agents and examples of alkyl and aryl side chains containing free isocyanate groups which may be used in the practice of this invention. Examples XIV and XV illustrate the preparation of polymers utilizing the latex technique in chain extension. It is understood that the urethane-urea polymers of this invention will vary structurally depending upon the prepolymer, chain-extending agent, and the nature of the organic polyisocyanate side chain containing free isocyanate groups used.

As many different embodiments of this invention may be made without departing from the spirit and scope thereof, it is to be understood that the invention is not limited to the specific embodiments thereof except as defined by the appended claims.

What is claimed is:

1. A method of preparing high molecular weight urethane-urea polymers possessing an ordered arrangement of side branches containing excess functional isocyanate groups which consists essentially of the steps of
   (1) reacting at a temperature in the range of 50° C. to 130° C. for about 1 to 2 hours from about 1.2 to 2.0 moles of an organic diisocyanate (a) per mole of a glycol (b) having a molecular weight in the approximate range of 250–4,000 and selected from the group consisting of polyalkylene ether, polyester and polyurethane glycols, thereby forming a linear prepolymer (I);
   (2) adding said prepolymer (I) to a first inert liquid medium selected from the group consisting of aromatic and oxygenated solvents in an amount sufficient to provide therein a 10 to 50 weight percent concentration;
   (3) adding a chain-extending agent (II) consisting essentially of a mixture of hexamethylene diamine and 2-methylpiperazine to a second inert liquid medium selected from the group consisting of aromatic and oxygenated solvent in an amount sufficient to provide therein a 10 to 50 weight percent concentration, said chain-extending agent (II) having a molar ratio of 2-methylpiperazine to hexamethylene diamine in the range of 4.0:1.0 to 0.25:1.0;

(4) mixing said first liquid medium containing prepolymer (I) with said second liquid medium containing chain-extending agent (II) in a proportion such that the equivalent ratio of prepolymer (I) to the chain-extending agent (II) in the resulting mixture is in the range of 0.75:1.0 to 1.5:1.0, said mixing occuring at a temperature in the range of 0° to 25° C., thereby forming a linear intermediate (III); and (5) reacting said linear intermediate (III) with an organic polyisocyanate (IV) under anhydrous conditions at a temperature in the range of 50° to 120° C. and for a period in the range of 0.5 hour to 2 hours, the ratio of said organic polyisocyanate (IV) to said hexamethylene diamine in said chain-extending agent (II) being in the range of 0.6:1.0 to 3.2:1.0.

2. A method according to claim 1 in which said glycol (b) is polyoxypropylene glycol.

3. A method according to claim 1 in which said glycol (b) is a polyester glycol prepared by the esterification of adipic acid with polyoxypropylene glycol.

4. A method according to claim 1 in which said organic diisocyanate (a) is tolylene diisocyanate.

5. A method according to claim 1 in which said organic polyisocyanate (IV) is an organic diisocyanate.

6. A method according to claim 1 in which said organic polyisocyanate (IV) is tolylene diisocyanate.

7. A method according to claim 1 in which said organic polyisocyanate (IV) is 4,4-methylene bis (phenyl isocyanate).

8. A method according to claim 1 in which said organic polyisocyanate (IV) is hexamethylene diisocyanate.

9. A method according to claim 1 consisting essentially of the steps of (1) reacting at a temperature in the range of 50° C. to 130° C. for about 1 to 2 hours from about 1.2 to 2.0 moles of an organic diisocyanate (a) per mole of a glycol (b) having a molecular weight of 250 to 4,000 and selected from the group consisting of polyalkylene ether, polyester and polyurethane glycols, thereby forming a linear prepolymer (I);

(2) adding said prepolymer (I) to an inert liquid medium selected from the group consisting of aromatic and oxygenated solvents in an amount sufficient to provide therein a 30 to 35 weight percent concentration;

(3) adding a chain-extending agent (II) consisting essentially of a mixture of hexamethylene diamine and 2-methylpiperazine to a second inert liquid medium selected from the group consisting of aromatic and oxygenated solvents in an amount sufficient to provide therein a 20 to 25 weight percent concentration, said chain-extending agent (II) having a molar ratio of 2-methylpiperazine to hexamethylene diamine of about 1.5 to 1.0;

(4) mixing said liquid medium containing prepolymer (I) with said liquid medium containing chain-extending agent (II) in proportion such that the equivalent ratio of prepolymer (I) to chain-extending agent (II) in the resulting mixture is about 1.0 to 1.0, said mixing occurring with agitation at a temperature in the range of 10° to 15° C. and for a period in the range of 10 to 15 minutes, thereby forming a linear intermediate (III); and (5) reacting said linear intermediate (III) with an organic polyisocyanate (IV) under anhydrous conditions at a temperature in the range of 60° to 80° C. and for a period of about 1 hour, said organic polyisocyanate (IV) reactant having an equivalent ratio to the hexamethylene diamine in said chain-extending agent (II) of about 2.0:1.0.

10. The urethane-urea polymer of the method of claim 1.

References Cited

UNITED STATES PATENTS

| | | | |
|---|---|---|---|
| 2,901,467 | 8/1959 | Croco | 260—77.5 |
| 3,012,987 | 12/1961 | Ansul | 260—45.4 |
| 3,188,302 | 6/1965 | Lorenz | 260—77.5 |

FOREIGN PATENTS

| | | | |
|---|---|---|---|
| 674,407 | 11/1963 | Canada | 260—77.5UX |

DONALD E. CZAJA, Primary Examiner

H. S. COCKERAM, Assistant Examiner

U.S. Cl. X.R.

117—138.8; 260—32.8, 33.6, 34.2, 75, 77.5